(No Model.) 2 Sheets—Sheet 1.
J. J. WORLEY, J. K. ROBINSON & J. HILLIS.
RAKE.

No. 358,137. Patented Feb. 22, 1887.

Witnesses
Jos. S. Latimer
Wm. J. Little

J. J. Worley,
J. K. Robinson,
and Jacob Hillis,
Inventors.

By their Attorney,
J. R. Little.

N. PETERS, Photo-Lithographer, Washington, D. C.

(No Model.) 2 Sheets—Sheet 2.
J. J. WORLEY, J. K. ROBINSON & J. HILLIS.
RAKE.
No. 358,137. Patented Feb. 22, 1887.
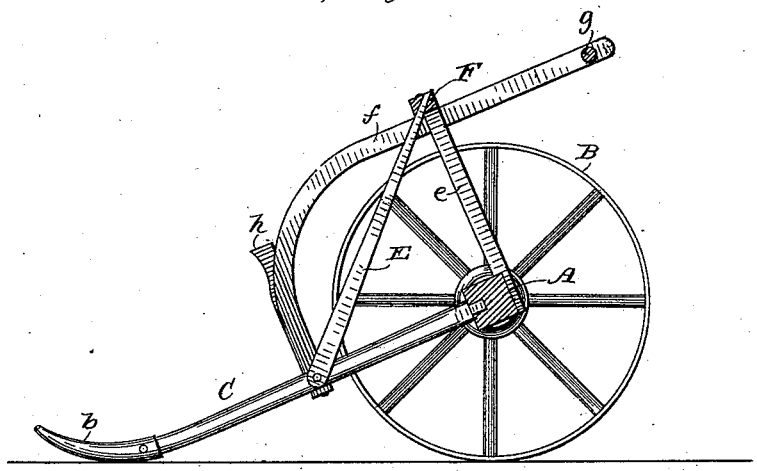
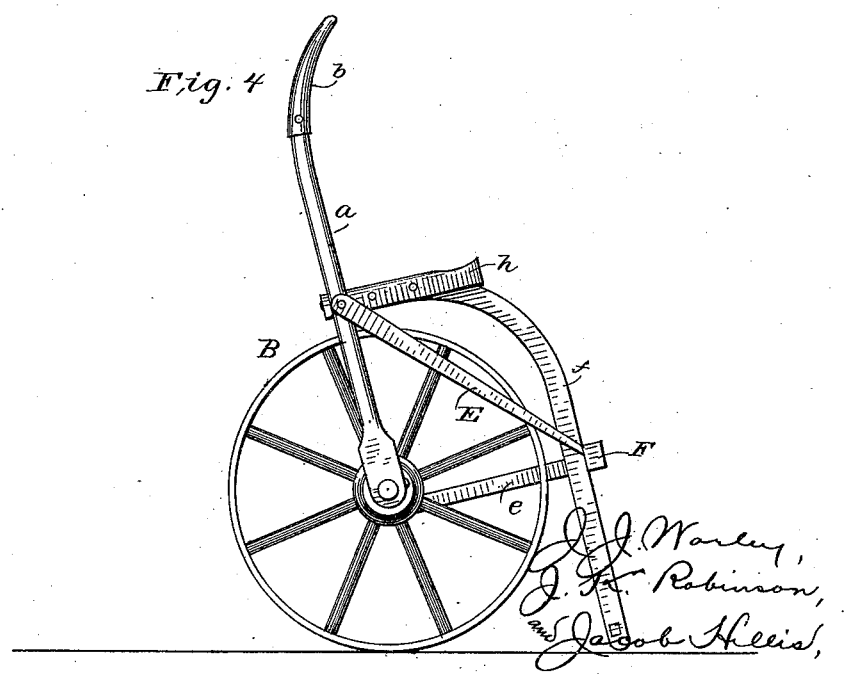

UNITED STATES PATENT OFFICE.

JOSHUA JETER WORLEY, JAMES K. ROBINSON, AND JACOB HILLIS, OF AURORA, ARKANSAS.

RAKE.

SPECIFICATION forming part of Letters Patent No. 358,137, dated February 22, 1887.

Application filed September 21, 1886. Serial No. 214,131. (No model.)

*To all whom it may concern:*

Be it known that we, JOSHUA JETER WORLEY, JAMES K. ROBINSON, and JACOB HILLIS, citizens of the United States, residing at Aurora, in the county of Madison and State of Arkansas, have invented certain new and useful Improvements in Rakes; and we do hereby declare that the following is a full, clear, and exact description of the invention, which will enable others skilled in the art to which it appertains to make and use the same.

Our invention relates to hand-rakes for gathering grain, &c., when cut by hand; and the object of the invention is to provide a rake which may be readily and easily manipulated by the person binding, which shall be simple in its construction, cheap to manufacture, and strong and durable.

With the above objects in view the invention consists in the improved construction and combinations of parts, hereinafter fully described, and pointed out in the claims.

Figure 1:
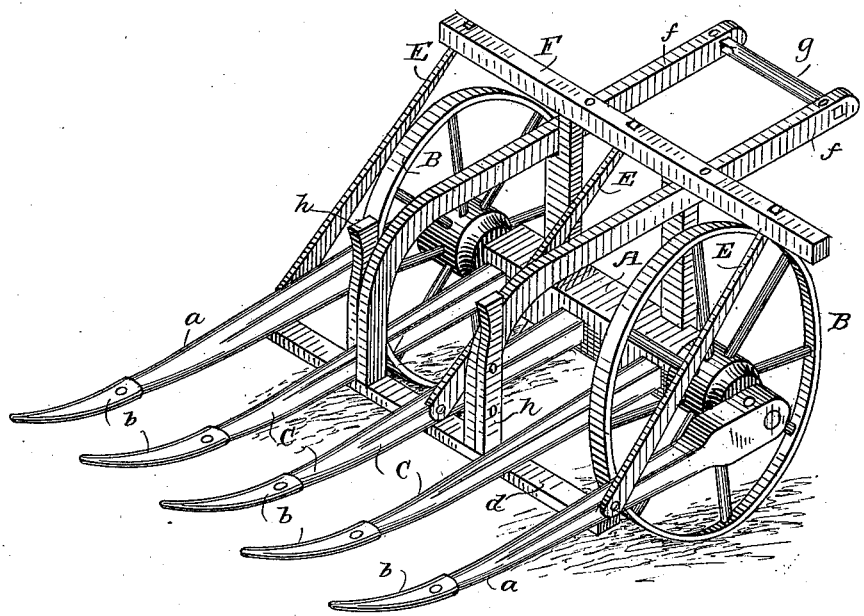
Figure 2:
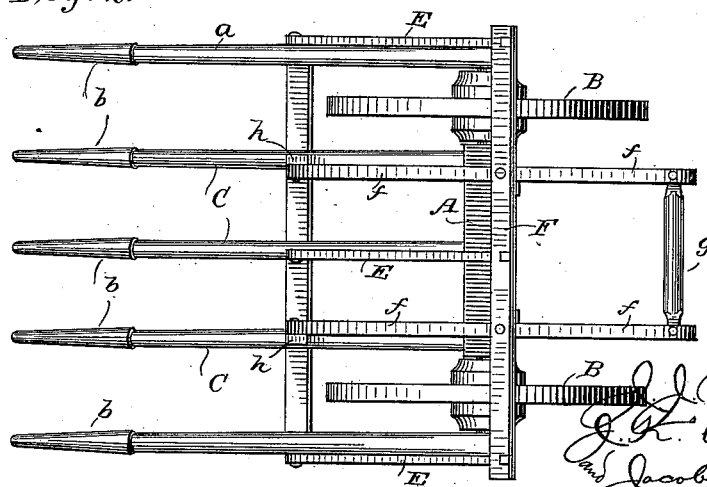

In the drawings, Figure 1 is a perspective view of a rake embodying our invention. Fig. 2 is a plan view. Fig. 3 is a longitudinal vertical section, and Fig. 4 is a side elevation, of the rake in its dumped position.

Corresponding parts in the several figures are denoted by the same letters of reference.

Referring to the drawings, A represents a beam or axle having the spindles at its ends, on which are mounted carrying-wheels B. The spindles extend beyond the carrying-wheels, and mounted on and secured to said spindles are rake-teeth $a$, one on each spindle, said rake-teeth extending forwardly, as shown.

C represents a series of teeth similar to those on the spindles, said teeth C being mortised in the beam or axle and extending forwardly therefrom. The teeth $a$ and C are curved, as shown, and rest upon the ground at their forward ends. The forward ends of the teeth may be provided with shoes $b$, if desired, the same being preferable where the rake is used upon stony ground. The said shoes may be of any well-known construction.

The teeth $a$ and C are connected and braced by a cross or tie beam, $d$, which is located a short distance in advance of the carrying-wheels.

Extending upwardly from the beam or axle A are two uprights, $e$, and secured to the beam $d$ and extending rearwardly therefrom are two curved arms, $f$. The arms $f$ extend rearwardly to a point about on a line with the rear faces of the carrying-wheels, and are connected at their rear ends by a handle, $g$.

Bars E extend from a cross, F, secured to the curved arms to the beam $d$, and form, in connection with the curved arms, a guard to hold the grain upon the front ends of the rake-teeth and to prevent it from striking against the wheels.

In operation the binder moves the rake in front of him until a sufficient quantity of grain is gathered by the teeth, when the rear end of the frame is depressed by lowering the curved arms. This action elevates the forward ends of the teeth, as shown in Fig. 3, and causes the grain to drop and rest on the bars $h$, so that it may be bound.

A rake constructed as thus described is simple, cheap, and durable, is effective in its operation, and may be readily and easily handled.

Having thus described our invention, what we claim is—

1. In a rake, the combination, with an axle and carrying-wheels mounted to revolve thereon, of a series of teeth secured to said axle and extending forwardly therefrom, a bar connecting the teeth, uprights extending from the axle, and handles secured to said uprights and connected with the bar connecting the teeth, substantially as set forth.

2. The combination, with the axle and carrying-wheels mounted to turn thereon, of a series of teeth secured to the axle and connected by a bar, uprights extending from the axle, a bar connecting said uprights, handles secured to the bars F, and the bracing-bars E, substantially as set forth.

In testimony whereof we affix our signatures in presence of two witnesses.

JOSHUA JETER WORLEY.
JAMES K. ROBINSON.
JACOB HILLIS.

Witnesses:
J. B. MASSIE,
N. H. COX.